United States Patent
Millar

(10) Patent No.: US 9,829,663 B2
(45) Date of Patent: Nov. 28, 2017

(54) SILICON CHIP WITH REFRACTIVE INDEX GRADIENT FOR OPTICAL COMMUNICATION

(71) Applicant: EMPIRE TECHNOLOGY DEVELOPMENT LLC, Wilmington (DE)

(72) Inventor: Benjamin William Millar, Rosebery (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 15/101,009

(22) PCT Filed: Feb. 25, 2014

(86) PCT No.: PCT/US2014/018328
§ 371 (c)(1),
(2) Date: Jun. 2, 2016

(87) PCT Pub. No.: WO2015/130261
PCT Pub. Date: Sep. 3, 2015

(65) Prior Publication Data
US 2016/0313521 A1 Oct. 27, 2016

(51) Int. Cl.
*G02B 6/36* (2006.01)
*G02B 6/43* (2006.01)
(Continued)

(52) U.S. Cl.
CPC ............... *G02B 6/43* (2013.01); *G02B 6/122* (2013.01); *G02B 6/12004* (2013.01); *G02B 6/13* (2013.01);
(Continued)

(58) Field of Classification Search
USPC .......................................................... 385/88
See application file for complete search history.

(56) References Cited

U.S. PATENT DOCUMENTS

| 4,000,937 A | 1/1977 | Kaminow |
| 4,343,536 A | 8/1982 | Watanabe et al. |
| (Continued) | | |

FOREIGN PATENT DOCUMENTS

| EP | 2428837 A1 | 3/2012 |
| JP | 2006119612 A | 5/2006 |
| WO | 2011162745 A1 | 12/2011 |

OTHER PUBLICATIONS

"Data Center Top-of-Rack Architecture Design," Cisco Systems, accessed at http://web.archive.org/web/20140801150849/http://www.cisco.com/c/en/us/products/collateral/switches/nexus-5000-series-switches/white_paper_c11-522337.pdf, accessed on Apr. 22, 2016, pp. 1-14.

(Continued)

*Primary Examiner* — Eric Wong
(74) *Attorney, Agent, or Firm* — Turk IP Law, LLC

(57) ABSTRACT

Technologies pertaining to a chip with a refractive index gradient, including fabrication thereof, are generally described. The refractive index gradient may be formed by creating atomic scale inclusions throughout a thickness of the chip by inducing nanoporosity into the chip, dissociating and diffusing oxygen into the chip, or performing chemical vapor deposition. One or more integrated circuit (IC) components and optical transceiver devices may be provided by mounting, growing, or etching the IC components and optical transceiver devices at a surface of the chip. The optical transceiver devices may be configured to transmit and/or receive an optical communication signal to and/or from at least one IC component or other optical transceiver device via an optical communication path within the thick- (Continued)

ness of the chip. The optical communication path may include a direction and distance, within the thickness of the chip, based on the refractive index gradient and angle of incidence.

22 Claims, 9 Drawing Sheets

(51) Int. Cl.
    *G02B 6/122* (2006.01)
    *G02B 6/13* (2006.01)
    *G02B 6/132* (2006.01)
    *G02B 6/134* (2006.01)
    *H04B 10/40* (2013.01)
    *H04B 10/80* (2013.01)
    *G02B 6/12* (2006.01)

(52) U.S. Cl.
    CPC ........... *G02B 6/132* (2013.01); *G02B 6/1342* (2013.01); *H04B 10/40* (2013.01); *H04B 10/801* (2013.01); *G02B 2006/12095* (2013.01)

(56) References Cited

U.S. PATENT DOCUMENTS

| | | | |
|---|---|---|---|
| 4,614,408 A | 9/1986 | Mir et al. | |
| 4,930,853 A | 6/1990 | Grego | |
| 5,291,567 A | 3/1994 | Revelli, Jr. et al. | |
| 5,337,397 A | 8/1994 | Lebby et al. | |
| 5,567,363 A | 10/1996 | Jung et al. | |
| 6,236,493 B1 | 5/2001 | Schmidt et al. | |
| 6,904,197 B2 | 6/2005 | Bhagavatula et al. | |
| 7,002,754 B2 | 2/2006 | Baer et al. | |
| 7,003,187 B2 | 2/2006 | Frick et al. | |
| 7,035,489 B2 | 4/2006 | Glebov et al. | |
| 7,079,716 B2 | 7/2006 | McIntyre | |
| 7,088,884 B2 | 8/2006 | Gerken et al. | |
| 7,149,385 B2 | 12/2006 | Parikka et al. | |
| 7,422,374 B2 | 9/2008 | Pitwon | |
| 7,742,508 B2 | 6/2010 | Ley et al. | |
| 7,903,338 B1 | 3/2011 | Wach | |
| 8,380,025 B2 | 2/2013 | Anderson et al. | |
| 2001/0053265 A1 | 12/2001 | Yamashita et al. | |
| 2002/0028045 A1 | 3/2002 | Yoshimura et al. | |
| 2002/0048427 A1 | 4/2002 | Chiarulli et al. | |
| 2003/0089915 A1 | 5/2003 | Yap | |
| 2004/0037512 A1 | 2/2004 | Cho et al. | |
| 2004/0071422 A1 | 4/2004 | Aylward et al. | |
| 2004/0086231 A1 | 5/2004 | Fukuyama et al. | |
| 2004/0249006 A1 | 12/2004 | Gleason et al. | |
| 2006/0152931 A1 | 7/2006 | Holman | |
| 2006/0210213 A1 | 9/2006 | Huang et al. | |
| 2008/0130094 A1 | 6/2008 | Tang | |
| 2009/0162004 A1 | 6/2009 | Johnson et al. | |
| 2010/0294989 A1 | 11/2010 | Shaffer, II et al. | |
| 2011/0112591 A1* | 5/2011 | Seymour ............... | A61B 5/0084 607/3 |
| 2011/0147773 A1 | 6/2011 | Kostka | |
| 2011/0240114 A1 | 10/2011 | Stewart et al. | |
| 2012/0057079 A1 | 3/2012 | Dallesasse et al. | |
| 2013/0004119 A1 | 1/2013 | Yin et al. | |
| 2013/0209780 A1 | 8/2013 | Poxson et al. | |
| 2013/0259430 A1* | 10/2013 | Tanaka ................ | G02B 6/4206 385/88 |
| 2016/0109653 A1* | 4/2016 | Vis ....................... | G02B 6/1221 385/27 |

OTHER PUBLICATIONS

"Electro-Optic Beam Deflection," accessed at https://web.archive.org/web/20130404010810/http://www.advr-inc.com/beamdeflectors.html, accessed on Apr. 22, 2016, pp. 1-2.
"Folded Grin Lens Collimates and Changes Direction of a Laser Diode Beam," DORIC Lenses Inc, accessed at https://web.archive.org/web/20130522174250/http://www.doriclenses.com/lire/62.html, accessed on Apr. 22, 2016, p. 1.
"Producing Multilayered Products and GRIN Optics," PolymerPlus LLC, accessed at https://web.archive.org/web/20131021132018/http://polymerplus.net/products, accessed on Apr. 22, 2016, pp. 1-2.
"Soldering copper wire on Glass by using Ultrasonic Soldering Iron," uploaded by Ultrasonic Applications, accessed at https://www.youtube.com/watch?v=NpJ8T8JWMMw, Uploaded on Dec. 21, 2011, pp. 1-2.
Bauer, S., "Poled polymers for sensors and photonic applications," Journal of Applied Physics, vol. 80, Issue 10, pp. 5531-5558 (Nov. 15, 1996).
Beals, J., et al., "Terabit Capacity Passive Polymer Optical Backplane," Lasers and Electro-Optics, 2008 and 2008 Conference on Quantum Electronics and Laser Science, pp. 2 (2008).
Benson, T. M., et al., "Progress towards achieving integrated circuit functionality using porous silicon optoelectronic components," Materials Science and Engineering, pp. 92-99 (1999).
Casse, G. et al., "Introduction of high oxygen concentrations into silicon wafers by high-temperature diffusion," Nuclear Instruments and Methods in Physics Research Section A: Accelerators, Spectrometers, Detectors and Associated Equipment, vol. 438, Issues 2-3, pp. 1-10 (Jan. 12, 1998).
Chen, R. T., "Graded-index polymer-based waveguide lens working at visible wavelengths on GaAs substrate for optoelectronic—interconnects," Appl. Phys. Lett., vol. 62, No. 20, pp. 2495-2497 (May 17, 1993).
Chen, R., et al., "Nanolasers grown on silicon," Nature Photonics, vol. 5, pp. 170-175 (Mar. 2011).
Gomez-Reino, C., et al., "Design of reconfigurable GRIN planar optical interconnects," Ed. Thienpont, H., et al., Proc. of SPIE, vol. 6992, pp. 699211-1-699211-10 (2008).
Guirao, C., "Bending a Laser beam Experiment," accessed at https://www.youtube.com/watch?v=zTx7UoPXyr4, Uploaded on Apr. 10, 2011, pp. 2.
Ilyas, S., and Gal, M., "Gradient refractive index planar microlens in Si using porous silicon," Applied Physics Letters, vol. 89, Issue 21, pp. 211123-1-211123-3 (2006).
International Search Report and Written Opinion for International Application No. PCT/US2014/18217 mailed on Jun. 32, 2014.
International Search Report and Written Opinion for International Application No. PCT/US2014/18203, mailed on Jun. 6, 2014.
International Search Report and Written Opinion for International Application No. PCT/US2014/18328, mailed on Jun. 6, 2014.
Ishii, Y., "Optoelectronic System-in-Package for Next-Generation Optical Interconnections," IEEE LEOS Newsletter, pp. 18-19 (Jun. 2005).
Kim, S-K., et al., "Photoassisted Corona Poled YLD-124/DR1-co-PMMA Electrooptic Device Using Photoisomerization," IEEE Photonics Technology Letters, vol. 23, Issue. 13, pp. 845-847 (Jul. 1, 2011).
Koike, Y., and Makoto, A., "The future of plastic optical fiber," NPG Asia Materials, vol. 1, No. 1, pp. 22-28 (Oct. 2009).
Kurosaka, Y., "On-chip beam-steering photonic-crystal lasers," Nature Photonics, vol. 4, Issue 7, pp. 2 (2010).
Mont, F. W., et al., "High refractive index nanoparticle-loaded encapsulants for light-emitting diodes," Proc. SPIE 6486, Light-Emitting Diodes: Research, Manufacturing, and Applications XI, 64861C, vol. 6486, pp. 64861C-1-64861C-8 (2007).
Morse, T. F., "Modified Chemical Vapor Deposition for Gradient Index Lenses," DTIC Document, Final Report ARO 24566.8-MS, pp. 7 (Nov. 1990).
Otte, D., et al., "Backplane Applications," iNEMI Technology Roadmaps, Optoelectronics, pp. 17-26 (Jan. 2009).
Park, Y. J., et al., "Control of thin ferroelectric polymer films for non-volatile memory applications," IEEE Transactions on Dielectrics and Electrical Insulation, vol. 17, Issue 4, pp. 1135-1163 (Aug. 2010).

(56) References Cited

OTHER PUBLICATIONS

Raiola, R., "Optical flex circuits eliminate cable congestion," accessed at http://www.electronicproducts.com/Passive_Components/Optical_flex_circuits_eliminate_cable_congestion.aspx, posted on Dec. 1, 2001, pp. 2.

Saeki, S., "[SID] Toshiba's LCD Panel Displays 2D, 3D Images at Same Time," accessed at https://web.archive.org/web/20120801173634/http://techon.nikkeibp.co.jp/english/NEWS_EN/20100602/183158/, Jun. 2, 2010, pp. 2.

Salameh, H. A. B., and Irshid, M. I., "Wavelength-Division Demultiplexing Using Graded-Index Planar Structures," Journal of Lightwave Tech., vol. 24, No. 6, pp. 2401-2408 (Jun. 2006).

Sato, T., et al., "Transmission-type PVDF 2-D optical phase modulator," Applied optics, vol. 20, Issue 2, pp. 343-350 (Jan. 15, 1981).

Schwesyg, J., et al., "Optical Characterization of Suspensions of Lithium Niobate Nanoparticles," pp. 19 (2006).

Sun, L., et al., "Polymeric waveguide prism-based electro-optic beam deflector," Optical Engineering, vol. 40, No. 7, pp. 1217-1222 (Jul. 2001).

Tajitsu, Y., et al., "Pockels Effects of Polyurea-5 Film Prepared by Vapor-Deposition Polymerization," Japanese Journal of Applied physics, vol. 38, No. 9B, pp. 5653-5656 (Sep. 1999).

Tervonen, A., et al., "Ion-exchanged glass waveguide technology: a review," Optical Eng., vol. 50, No. 7, pp. 071107-1-071107-15 (Jul. 2011).

Trost, H. - J., et al., "Using drop-on-demand technology for manufacturing GRIN Lenses," Proc. 2001 Ann. Mtg. ASPE, pp. 533-536 (Nov. 10-15, 2001).

Wegener, M., and Gerhard-Multhaupt, R., "Electric poling and electromechanical characterization of 0.1-mm-thick sensor films and 0.2-mm-thick cable layers from poly (Vinylidene Fluoride-Trifluroethylene)," IEEE Transactions on Ultrasonics, Ferroelectrics and Frequency Control, vol. 50, Issue 7, pp. 921-931 (Jul. 2003).

Weiss, S.M., "Tunable porous silicon photonic bandgap structures: Mirrors for optical interconnects and optical switching," Thesis, pp. 144 (2005).

Yang, H., et al., "Transfer-printed stacked nanomembrane lasers on silicon," Nature Photonics, vol. 6, pp. 615-620 (Jul. 22, 2012).

Ye, C., "Three-dimensional Gradient Index Optics Fabricated in Diffusive Photopolymers," Thesis, pp. 224 (2012).

Yilmaz, S., et al., "Dielectric, pyroelectric, and electro-optic monitoring of the cross-linking process and photoinduced poling of Red Acid Magly," App. Phys. Lett., vol. 70, No. 5, pp. 568-570 (1997).

Yi-Yan, A., et al., "Grafted GaAs detectors on lithium niobate and glass optical Waveguides," IEEE Photonics Technology Letters, vol. 1, No. 11, pp. 379-380 (Nov. 1989).

Kim, G., and Chen, R.T., "Three-dimensionally interconnected multi-bus-line bidirectional optical backplane," Optical Engineering, vol. 38, No. 9, pp. 1560-1566 (Sep. 1, 1999), 7 pages.

\* cited by examiner

SILICON CHIP WITH REFRACTIVE INDEX GRADIENT FOR OPTICAL COMMUNICATION

CROSS-REFERENCE TO RELATED APPLICATION

This Application is the U.S. National Stage filing wider 35 U.S.C. §371 of International Application No. PCT/US14/18328, filed on Feb. 25, 2014. The International Application is herein incorporated by reference in its entirety.

BACKGROUND

Unless otherwise indicated herein, the materials described in this section are not prior art to the claims in this application and are not admitted to be prior art by inclusion in this section.

Purely electrical integrated circuits, such as those embodied in chips, provide a mechanical and electrical framework for operation and communication among cores and various other components. Electrical communication signals may present inherent limitations on communication bandwidth and quality. For example, electrical signals may be susceptible to interference, such as noise from other components on the chip or from external sources. On the other hand, an increasingly higher number and variety of electronic components may have the capability to support optical communication. Optical communication signals may be less susceptible to interference, compared to electrical communication signals, and ma provide comparatively much wider bandwidths.

Current attempts to support both electrical and optical communications on chips, however, could use some improvements and/or alternative or additional solutions in order to effectively and efficiently communicate optical signals.

SUMMARY

The present disclosure generally describes techniques pertaining to a chip with a refractive index gradient configured to facilitate on-chip optical communication, including fabrication thereof.

According to some examples, apparatuses that include optical communication capability are described. An example apparatus may include a chip, a refractive index gradient formed across a thickness of the chip, one or more integrated circuit (IC) components at a surface of the chip, and one or more optical transceiver devices at the surface of the chip. The optical transceiver devices may be configured to transmit an optical communication signal to, or receive the optical communication signal from, at least one of the IC components via an optical communication path within the thickness of the chip, where the optical communication path may include a direction and distance, within the thickness of the chip, that is based on the refractive index gradient and angle of incidence.

According to other examples, methods to fabricate a chip to facilitate optical communication are provided. An example method may include forming a refractive index gradient across a thickness of the chip, forming one or more integrated circuit (IC) components at a surface of the chip, and providing one or more optical transceiver devices at the surface of the chip. The optical transceiver devices may he configured to transmit an optical communication signal to, or receive the optical communication signal from, at least one of the IC components or other optical transceiver device via an optical communication path within the thickness of the chip, where the optical communication path may include a direction and distance, within the thickness of the chip, that is based on the refractive index gradient formed and angle of incidence.

According to further examples, systems to fabricate a chip to facilitate optical communication are described. An example system may include a gradient index (GRIN) formation module configured to firm a refractive index gradient throughout a thickness of the chip, where the refractive index gradient may decrease from a top surface of the chip to a bottom surface of the chip. The example system may also include an optical transceiver formation module configured to mount, grow, and/or etch one or more integrated circuit (IC) components and one or more optical transceiver devices at the top surface of the chip. The optical transceiver devices may be configured to transmit an optical communication signal to, or receive the optical communication signal from, at least one of the IC components or other optical transceiver device via an optical communication path within the thickness of the chip, where the optical communication path may include a direction and distance, within the thickness of the chip, that is based on the refractive index gradient and angle of incidence. The example system may further include a controller coupled to and configured to coordinate operations of the GRIN formation module and optical transceiver formation module.

According to yet further examples, methods to operate a chip to facilitate optical communication are provided. An example method may include outputting an optical communication signal from
a first optical transceiver device located at a surface of the chip, where the chip may include a refractive index gradient across a thickness of the chip. The example method may also include propagating the optical communication signal from the first optical transceiver device to a second optical transceiver device, located at a same surface of the chip, via an optical communication path within the thickness of the chip, where the optical communication path may include a direction and distance, within the thickness of the chip, that is based on the refractive index gradient and angle of incidence.

The foregoing summary is illustrative only and is not intended to be in any way limiting, in addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more full apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
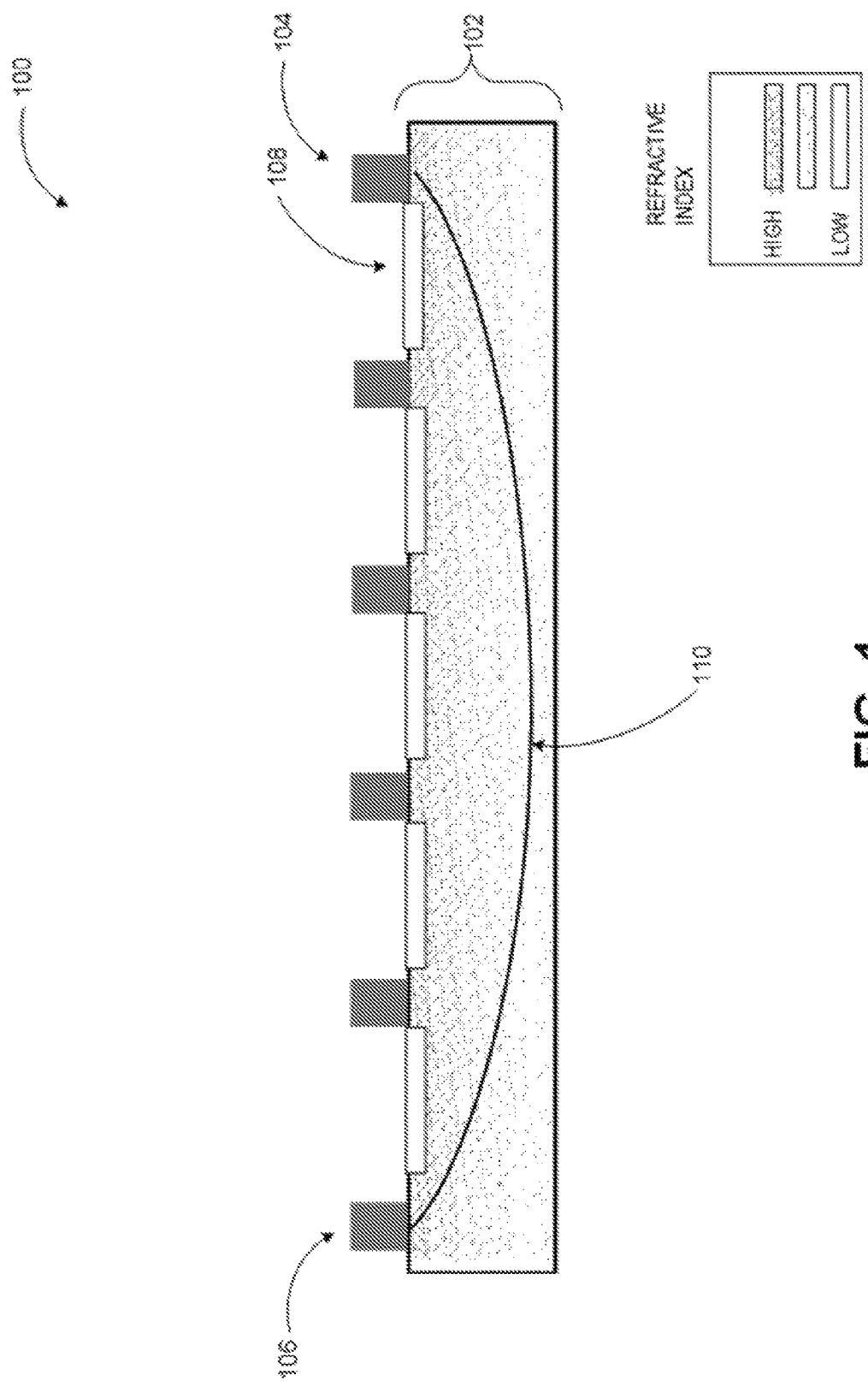
FIG. 1 illustrates an example cross section of a chip with a refractive index gradient to facilitate on-chip optical communication.

In the following detailed description, reference is made to the accompanying drawings, which form a pan hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of Which are explicitly contemplated herein.

This disclosure is generally drawn, inter alia, to methods, apparatus, systems, devices, and/or computer program products related to a chip with a refractive index gradient to facilitate on-chip optical communication, including fabrication thereof Briefly stated, technologies pertaining to a chip with a refractive index gradient, including fabrication thereof, are generally described, The refractive index gradient may be formed by creating. atomic scale inclusions throughout a thickness of the chip by inducing nanoporosity into the chip, dissociating and diffusing oxygen into the chip, or performing chemical vapor deposition. One or more integrated circuit (IC) components and optical transceiver devices may be provided by mounting, growing, or etching the IC components and optical transceiver devices at a surface of the chip. The optical transceiver devices may be configured to transmit and/or receive an optical communication signal to author from at least one IC component or other optical transceiver device via an optical communication path within the thickness of the chip. The optical communication path may include a direction and distance, within the thickness of the chip, based on the refractive index gradient and angle of incidence.

FIG. 1 illustrates an example cross section of a chip with a refractive index gradient to facilitate on-chip optical communication, arranged in accordance with at least some embodiments described herein.

As shown in a diagram 100, a chip 102. may include a refractive index gradient across a thickness of a chip 102, one or more IC components 108) and one or more optical transceiver devices, such as laser emitters and/or laser detectors (e.g., 104 and 106), at a surface of the chip 102. Each transceiver device may be electrically coupled to a corresponding IC component, thereby enabling such IC components to optically communicate with each other via their respective transceiver device. The IC components and optical transceiver devices may be formed and/or provided by etching, mounting, or growing the IC components and optical transceiver devices at locations along the surface of the chip 102 based on an approximate angle of incidence for an optical communication path 110 between communicatively coupled components and devices. The chip 102 may also include a layer of conductive traces at the surface of the chip 102 and/or one or more layers of conductive traces within the thickness of the chip 102. The location of the layer(s) of conductive traces may be based on a density of the IC components (e.g., 108) at the surface of the chip 102. Furthermore, the layer(s) of conductive traces may be placed in a location such that the conductive traces avoid paths of optical communication signals transmitted through the chip 102.

An optical communication signal may be outputted and propagated from a first optical transceiver device, such as laser emitter 104, to a second optical transceiver device, such as laser detector 106, located on the same surface of the chip 102, via an optical communication path 110 within the thickness of the chip 102. In other embodiments, the optical communication signal may be propagated from the first optical transceiver device to another optical transceiver device located on a different. surface of the chip 102 or on another chip, circuit board, or other similar optical communication device oriented beneath or otherwise proximate to the chip 102, The optical communication path 110 may include a direction and distance within the thickness of the chip 102 that is based on the refractive index gradient and angle of incidence. The optical transceiver devices may be configured to project the optical communication signal statically or dynamically to propagate the optical communication signal, where a direction and an incident angle of the propagated optical communication signal may be based on a particular planar direction and a distance to be traveled by the propagated optical communication signal. For example, the optical communication signal may turn into material of higher refractive index and may turn away from those with lower refractive index due to phase velocity effects. As a result of the composition of the refractive index gradient, if the optical communication signal is projected close to the surface of the chip (higher refractive index), the optical communication signal may be rapidly bent. If the optical communication signal is projected further away closer to the opposite surface (lower refractive index), the optical communication signal may be bent slowly. Such are but some examples of the direction(s) of the optical communication path 110 via which the optical communication signal may travel. The optical communication signal may include a collimated beam that includes a laser beam, a visible light beam, or an infrared beam.

The chip 102 may be composed of silicon using techniques for chip manufacture and the refractive index may be formed by creating atomic scale inclusions within the thickness of the chip 102, where the thickness of the chip may be less than or approximately 1 millimeter (mm), for example. The inclusions may be formed within the thickness of the chip 102 such that a density of the inclusions may increase from a surface of the chip 102 comprising the optical transceiver devices to an opposite surface of the chip. The inclusions may have a lower refractive index than the chip 102. Therefore, as the density of the inclusions increases, the refractive index gradient of the chip 102 may decrease, Consequently, the refractive index gradient of the chip 102 may decrease from the surface of the chip 102 comprising the IC components and optical transceiver devices to the opposite surface of the chip 102, as illustrated in FIG. 1.

The inclusions may be created by a variety of techniques including nanoporosity induction into the chip 102, oxygen dissociation and diffusion into the chip 102, chemical vapor deposition, and/or other technique(s) and combination(s) thereof. Nanoporosity may be induced into the chip 102 via sputter deposition or anodization, for example, to create the inclusions. Oxygen may be dissociated and diffused into the chip 102, for example, by forming, a layer of silica on the surface of the chip 102, raising the layer of silica to a high temperature, and keeping the layer of silica at the high temperature for a particular time period to dissociate and diffuse the oxygen into the chip 102. Chemical vapor deposition may be performed, for example, by silane deposition of silicon and introduction of increasing concentrations of oxygen to the chip 102. The techniques to create the inclusions may be performed through the opposite surface of the chip 102 in order to protect function of the IC components and optical transceiver devices, The techniques may also be depth controlled to enable correct formation of the refractive index gradient.

The shape of the refractive index gradient that is formed may have some impact on how the optical communication signal travels within the thickness of the chip 102 via the optical communication path 110. For example, if the refractive index decreases slowly at the surface of the chip comprising the optical transceiver devices and more rapidly at the opposite surface of the chip, projection of the optical communication signal at smaller incident angles may result in a shorter distance traveled and projection at larger incident angles may result in a longer distance traveled. In another example, if the refractive index decreases rapidly at the surface of the chip comprising the optical transceiver devices and more slowly at the opposite surface of the chip, projection of the optical communication signal at smaller incident angles may result in a longer distance traveled and projection at larger incident angles may result in a shorter distance traveled.

Figure 2:
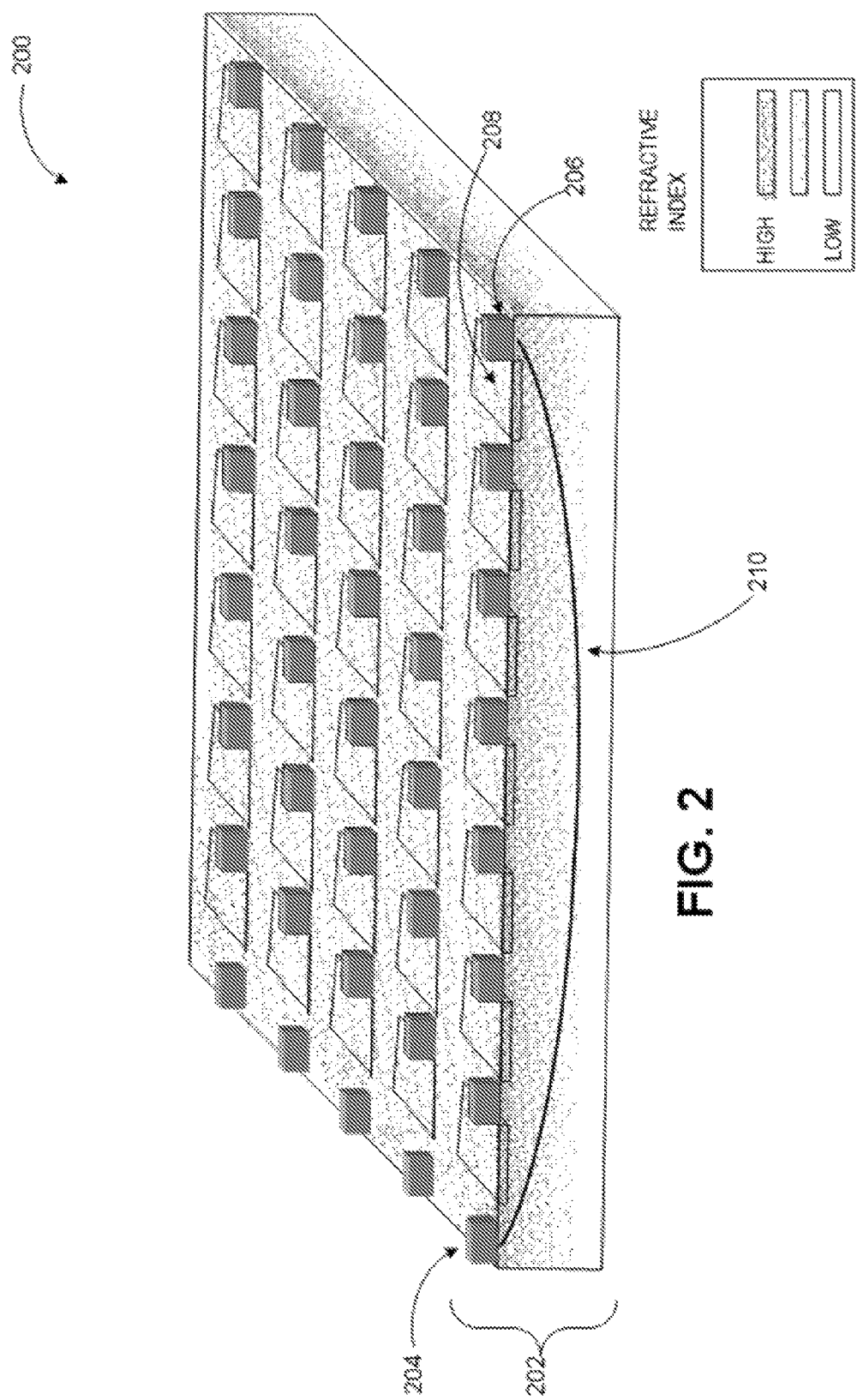
FIG. 2 illustrates an example three-dimensional (3D) chip with a refractive index gradient to facilitate on-chip optical communication.

FIG. 2 illustrates an example three-dimensional (3D) chip with a refractive index gradient to facilitate on-chip optical communication, arranged in accordance with at least some embodiments described herein.

As shown in a diagram 200, a chip 202 may include a refractive index gradient across a thickness of the chip 202, one or more IC. components (e.g., 208), and one or more optical transceiver devices, such as and laser emitters and/or laser detectors (e.g., 204 and 206), at a surface of the chip 202. Each transceiver device may be electrically coupled to a corresponding IC component, thereby enabling such IC components to optically communicate with each other via their respective transceiver device. The chip 202 may also include a layer of conductive traces at the surface of the chip 202 and/or one or more layers of conductive traces within the thickness of the chip 202. The location of the layer(s) of conductive traces may be based on a density of the IC components (e.g., 208) at the surface of the chip 202. Furthermore, the layer(s) of conductive traces may be placed in a location such that the conductive traces avoid paths of optical communication signals transmitted through the chip 202.

An optical communication signal may be outputted and propagated from a first optical transceiver device, such as laser emitter 204, to a second optical transceiver device, such as laser detector 206, located at a same surface of the chip 202, via an optical communication path 210 within the thickness of the chip 202, In other embodiments, the optical communication signal may be propagated from the first optical transceiver device to another optical transceiver device located on a different surface of the chip 202 or on another chip, circuit board, or other similar optical communication device oriented beneath the chip 102. The optical communication path 210 may include a direction, within the thickness of the chip 202.

As discussed previously, the chip 202 may be composed of silicon using techniques for chip manufacture and the refractive index may be formed by creating atomic scale inclusions composed of silica within the thickness of the chip 202. The inclusions may have a lower refractive index than the chip 202. Therefore, as the density of the inclusions increases from the surface of the chip 202 comprising the IC components and the optical transceiver devices to an opposite surface of the chip, the refractive index gradient of the chip 202 may decrease. Consequently, the refractive index gradient of the chip 202 may decrease from the surface of the chip 202 comprising the IC components and optical transceiver devices to the opposite surface of the chip 202, as illustrated in FIG. 2.

In one embodiment, nanoporosity may be induced into the chip 202 via sputter deposition or anodization, for example, to create the inclusions within the thickness of the chip 202 in order to form the refractive index gradient. Sputter deposition may include, for example, sputtering of the silicon chip in a helium atmosphere at a moderated power to induce nanoporosity. Anodization may include producing a gradient current density within the thickness of the chip using, for example, an anodizing electrode configuration to induce nanoporosity. Induction of a significant volume fraction of nanoporosity into the chip 202 composed of silicon may produce porous silicon. Porous silicon may possess optical properties of interest including a very low refractive index, The refractive index within the thickness of the chip 202 may vary from about greater than 3.0 to 1.3 dependent on a degree of porosity formed throughout the thickness of the chip 202. In sputter deposition, the degree of porosity formed may be dependent on an amount of power supplied, and in anodization, the degree of porosity formed may be dependent on a current density provided. As a result, the degree of porosity may be easily and tightly controlled in manufacturing processes.

In another embodiment, oxygen may be dissociated and diffused into the chip 202 to create the inclusions within the thickness of the chip 202 in order to form the refractive index gradient. A layer of silica may be formed on the surface of the chip 202, where the layer is up to several microns thick, for example. The chip 202 may then be raised to a high temperature, approximately 800 to 1200° C. for example, and held at the high temperature for about 24 to 48 hours, for example, to enable the oxygen to dissociate from the silica layer and diffuse into the chip 202 forming a controllable oxygen concentration gradient. Upon slow cooling of the chip 202, a silica concentration gradient may be formed and because the silica has a lower refractive index than the chip 202 composed of silicon, the refractive index gradient is formed throughout the thickness of the chip 202. In other examples, carbon or nitrogen may be dissociated and diffused into the chip 202 in order to form the refractive index gradient. A layer of carbide or nitride may be formed on the surface of the chip 202, and the chip 202 may be raised to and held at a high temperature to enable the carbon or nitrogen to dissociate from the carbon or nitride layer. The carbon or nitrogen may then diffuse into the chip 202 forming a controllable carbon or nitrogen concentration gradient.

In a further embodiment, chemical vapor deposition, for example, may be performed to create the inclusions within the thickness of the chip 202 in order to form the refractive index gradient. Silane gas deposition of the chip 202 may be followed by introduction of increasing concentrations of oxygen to create silica inclusions. As discussed previously, silica may have a lower refractive index than the chip 202 composed of silicon, thereby enabling the refractive index gradient to be formed throughout the thickness of the chip 202. Chemical vapor deposition may enable tighter control over the refractive index gradient that is formed.

The embodiments described above to create the inclusions within the thickness of the chip 202 may be performed through a surface of the chip 202 opposite to the surface of the chip comprising the IC components and optical transceiver devices in order to protect function of the IC components and optical transceiver devices. The techniques may also be depth controlled to enable correct formation of the refractive index gradient.

Figure 3:
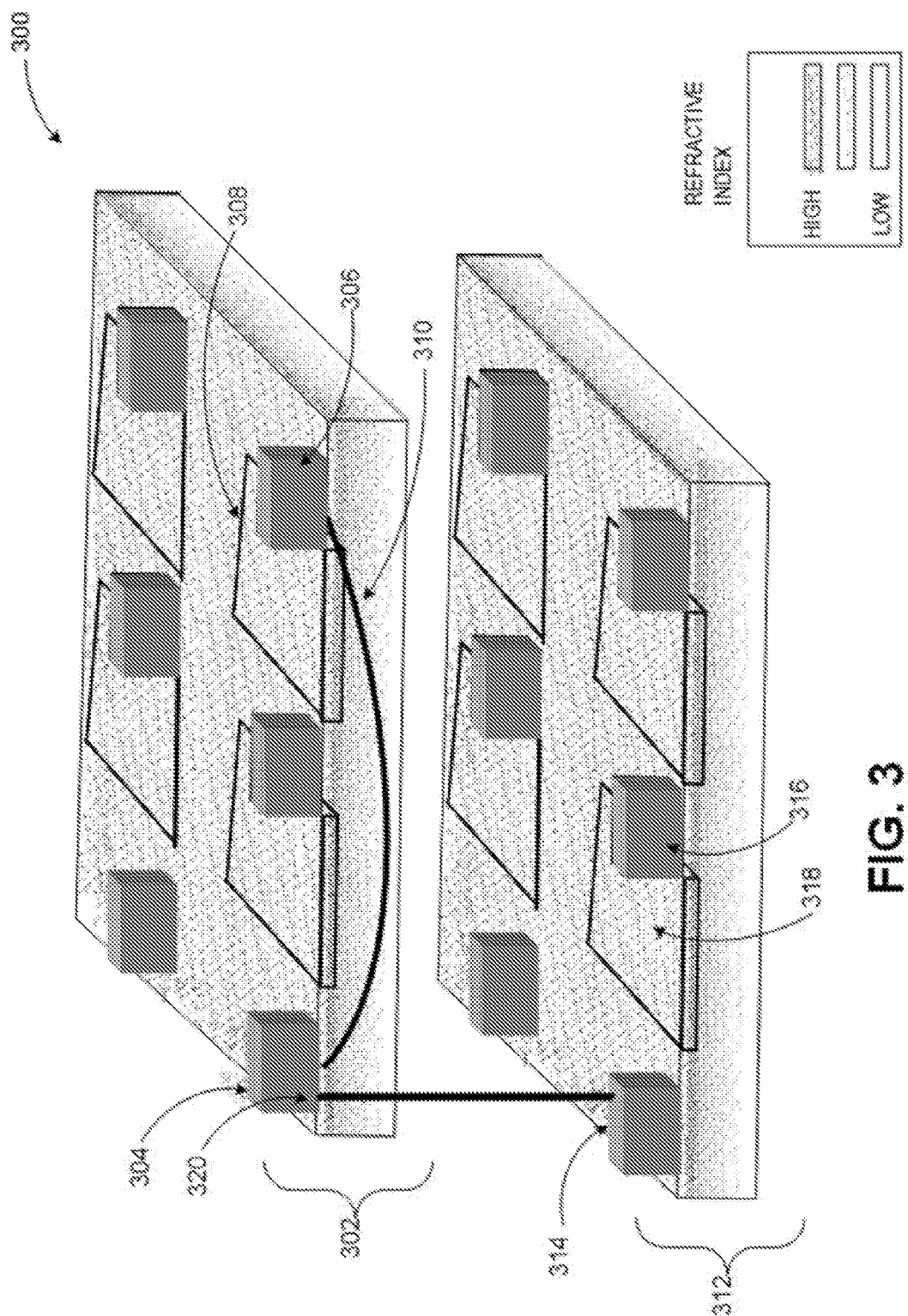
FIG. 3 illustrates an example of a plurality of chips configured to optically communicate in a stacked formation.

FIG. 3 illustrates an example of a plurality of chips configured to optically communicate in a stacked formation, arranged in accordance with at least some embodiments described herein.

As shown in a diagram 300, a first chip 302 and a second chip 312 may be oriented in a stacked formation. Each chip may include a refractive index gradient across a thickness of the chip, one or more IC components (e.g., 308 and 318). and one or more optical transceiver devices, such as laser emitters and/or laser detectors 304, 306, 314, and 316), at a surface of the chip.

An optical communication signal may be outputted and propagated from a first optical transceiver device, such as laser emitter 304, to a second optical transceiver device, such as laser detector 306, located at the surface of the first chip 302, via an optical communication path 310 within the thickness of the first chip 302, thereby enabling IC components respectively electrically coupled to the first and second optical transceiver devices to optically communicate with each other. The optical communication path 310 may include a direction and distance within the thickness of the first chip 302 that is based on the refractive index gradient of the first chip 302 and an angle of incidence. The first optical transceiver device, laser emitter 304, may be configured to project the optical communication signal statically or dynamically to propagate the optical communication signal, where a direction and an incident angle of the projected optical communication signal may be based on a particular planar direction and a distance to be traveled by the projected optical communication signal. The optical communication signal may include a collimated beam that includes a laser beam, a visible light beam, or an infrared beam.

An optical communication signal 320 may also be projected vertically from the first optical transceiver device, the laser emitter 304, to another optical transceiver device, such as laser detector 314, located on a surface of the second chip 312. The optical communication signal 320 may be projected vertically based on the refractive index gradient and angle of incidence, without any physical modifications being made to the first chip 302. In other embodiments, the optical signal may be projected to one or more other optical communication devices, such as multiple chips and/or a circuit board. The other optical communication devices may be above or below the first chip 302 in a stacked formation, or other similar orientation. The optical communication signal may then be optically communicated within the other chip, circuit board, etc., using optical communication techniques such as those described in FIGS. 1-3 above.

Figure 4:
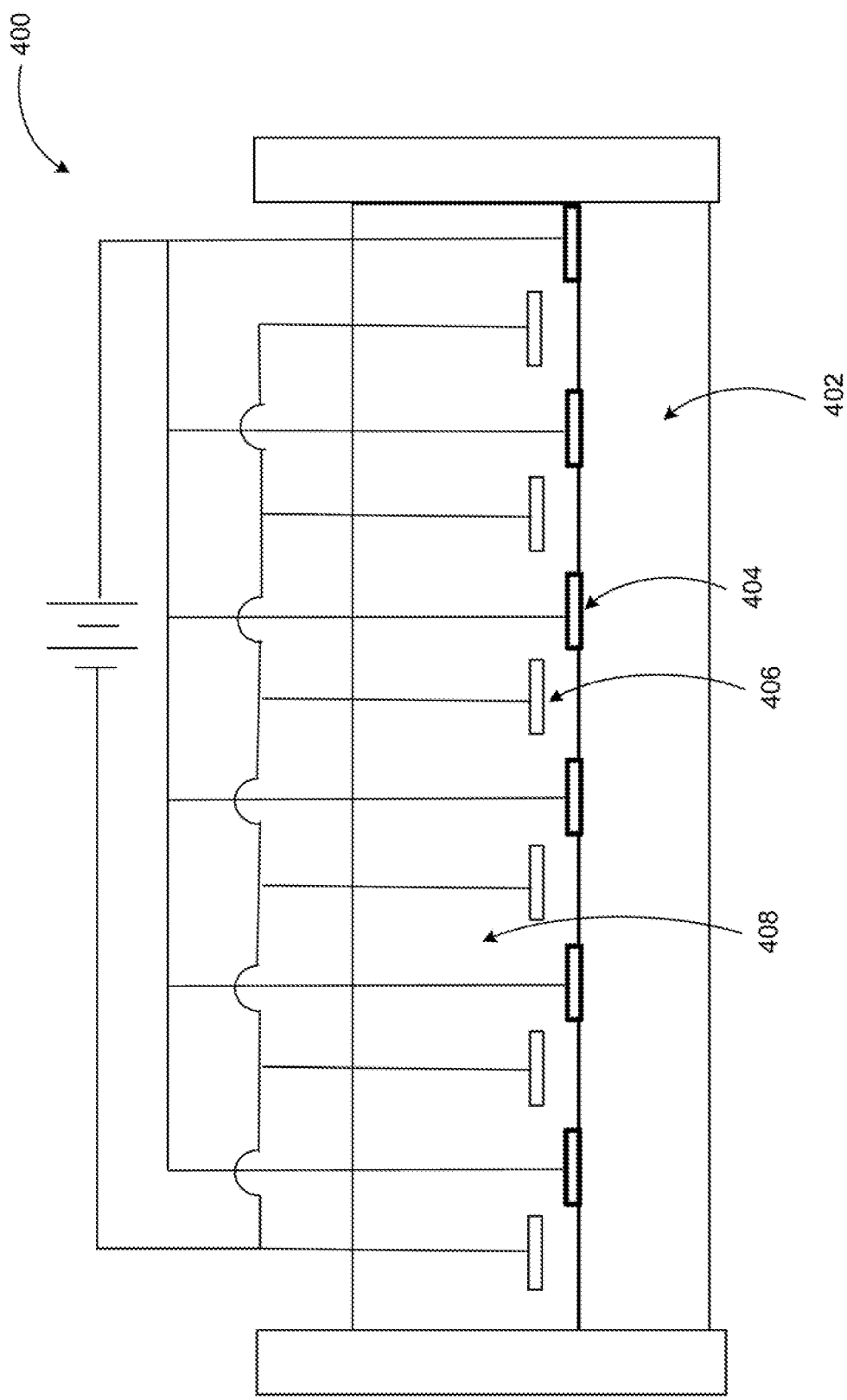
FIG. 4 illustrates an example anodization electrode configuration employed to induce nanoporosity into a chip to form a refractive index gradient throughout a thickness of the chip.

FIG. 4 illustrates an example of an anodization electrode configuration employed to induce nanoporosity into a chip to form a refractive index gradient throughout a thickness of the chip, arranged in accordance with at least some embodiments described herein.

As discussed previously in FIG. 2, nanoporosity may be induced into a chip via sputter deposition or anodization, for example, to create inclusions within the thickness of the chip in order to form the refractive index gradient. An anodization process may include, for example, producing a current density gradient within the thickness of the chip using an anodizing electrode configuration to induce nanoporosity, where the degree of porosity formed may be dependent on the current density provided. An example of the anodizing electrode configuration is illustrated in FIG. 4.

As shown in a diagram 400, a chip 402 may be placed. in a structure (for example, an anodization bath) such that a surface of the chip (opposite to the surface of the chip with one or more IC components and/or optical transceiver devices) is in contact with the one or more insulated electrodes 404, serving as the cathodes. One or more bare electrodes 406 may be placed adjacent to the insulated electrodes, and an electrolyte solution 408 may be placed within the structure. A direct current may be passed through the electrolyte solution 408 with the chip 402 serving as the anode. The current may cause a release of hydrogen at the one or more insulated electrodes 404 and a release of oxygen at the surface of the chip 402 in contact with the insulated electrodes 404. The release of hydrogen and oxygen may create inclusions comprised of porous silicon at the surface of the chip 402 in contact with the insulated electrodes 404. By varying a density of the current passed through the electrolyte solution, the degree of porosity within the chip 402 may be varied and subsequently the refractive index gradient may be varied.

The density of the created inclusions may be higher at the surface of the chip 402 in contact with the insulated electrodes and because the inclusions have a lower refractive index than the chip 402, as the density of the inclusions increases the refractive index gradient of the chip 402 may decrease. Consequently, the refractive index gradient may decrease from a surface of the chip 402 comprising one or more IC components and/or optical transceivers (where the inclusion density is low) to the opposite surface of the chip in contact with the insulated electrodes (where the inclusion density as high).

Figure 5:
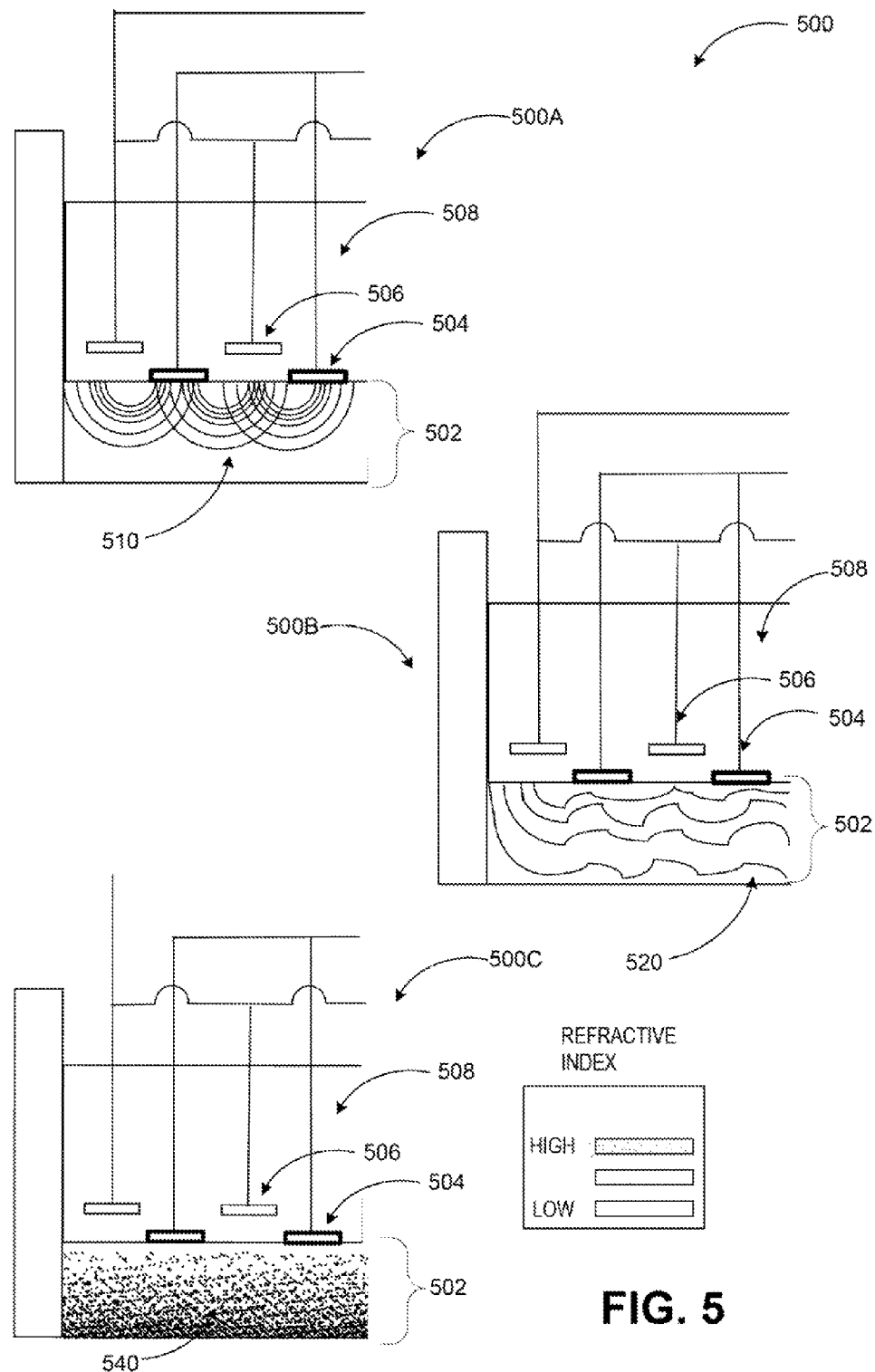
FIG. 5 illustrates one or more examples of current density distribution in a chip during anodization and a resulting refractive index gradient formed throughout a thickness of the chip.

FIG. 5 illustrates one or more examples of current density distribution in a chip during anodization and a resulting refractive index gradient formed throughout a thickness of the chip, arranged in accordance with at least some embodiments described herein.

As described previously in FIG. 4, in an anodization electrode configuration, a chip 502 may be placed in the configuration such that a surface of the chip opposite to a surface of the chip comprising one or more IC components and/or optical transceiver devices is in contact with the one or more insulated electrodes 504, serving as the cathodes. One or more bare electrodes 506 may be placed adjacent to the insulated electrodes 504, and an electrolyte solution 508 may be placed within the structure. A direct current may be passed through the electrolyte solution 508, with the chip 502 serving as the anode. The current may release hydrogen at the one or more insulated electrodes 504 and oxygen at the surface of the chip 502 in contact with the insulated electrodes 504, creating the inclusions comprised of porous silicon at. the surface of the chip 502 in contact with the insulated electrodes 504. By changing a density of the current passed through the electrolyte solution 508, the degree of porosity within the chip 502 may be varied, and subsequently, the refractive index gradient may be varied.

Diagram 500A illustrates an example of the current density distribution as one or more discrete fields between the insulated electrodes 504 and the bare electrodes 506. Diagram 50013 illustrates an example of the current density distribution as one or more superimposed fields showing an overall gradient effect within the chip 502. Diagram 500C illustrates the refractive index gradient that may be formed by the silica inclusions. As shown in the diagram 500C, the density of the inclusions created may be higher at the surface of the chip 502 in contact with the insulated electrodes 504. Because the inclusions may have a lower refractive index than the chip 502, as the density of the inclusions increases, the refractive index gradient of the chip 502 may decrease. Consequently, the refractive index gradient may decrease from a surface of the chip 502 comprising the IC components and/or optical transceivers (where the inclusion density is low) to the opposite surface of the chip in contact with the insulated electrodes 504 (where the inclusion density as high).

Figure 6:
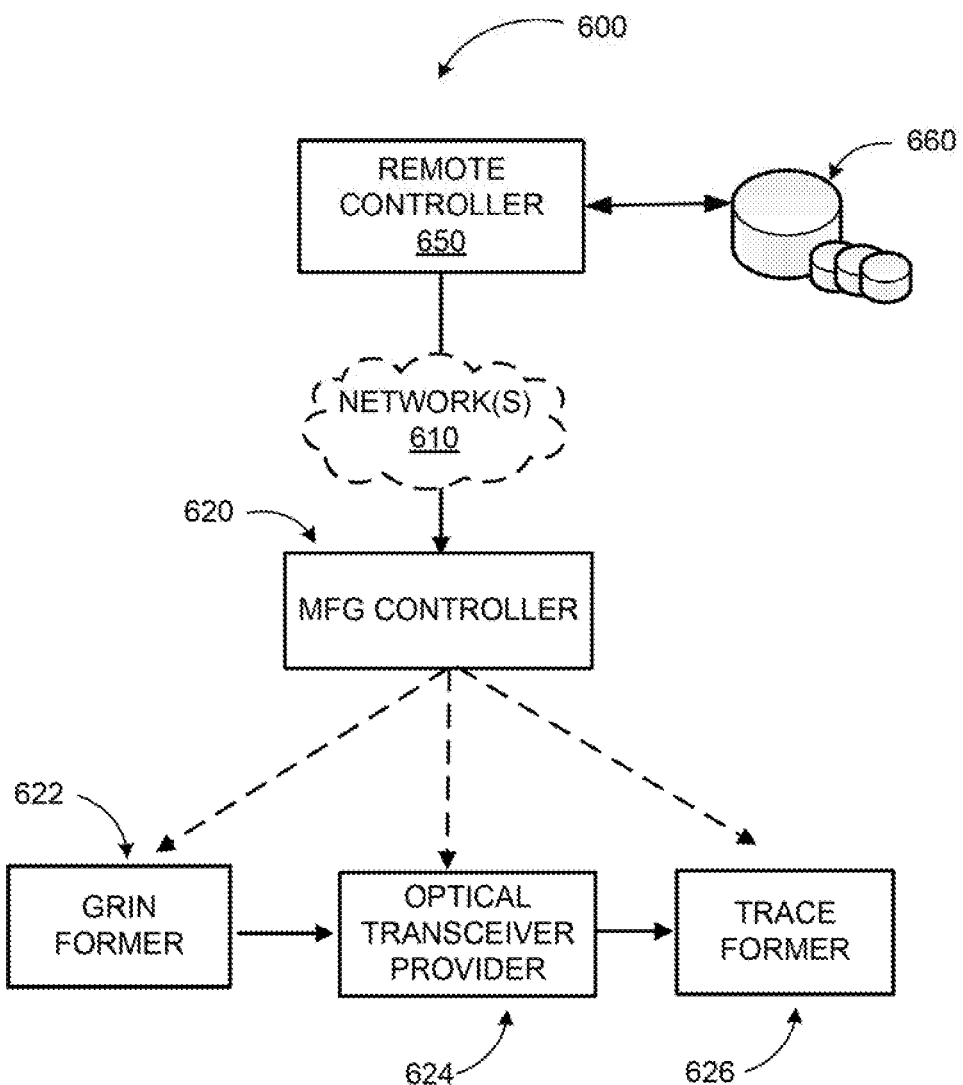
FIG. 6 illustrates an example system to fabricate a chip with a refractive index gradient to facilitate on-chip optical communication.

FIG. 6 illustrates an example system to fabricate a chip with gradient refractive index, arranged in accordance with at least some embodiments described herein.

System 600 may include a manufacturing controller 620, a gradient index (GRIN) former 622, an optical transceiver provider 624, and a trace former 626. The manufacturing controller 620 may be operated by human control or may be configured for automatic operation, or may be directed by a remote controller 650 through at least one network (for example, via network 610). Data associated with controlling the different processes of chip fabrication may be stored at and/or received from data stores 660.

The manufacturing controller 620 may include or control a GRIN formation module configured to form a refractive index gradient throughout a thickness of a chip and an optical transceiver formation module configured to provide one or more optical transceiver devices at a surface of the chip. In one embodiment, such a fabrication module may comprise the GRIN former 622, and such an optical transceiver formation module may comprise the optical transceiver provider 624. The manufacturing controller 620 may also include or control a trace formation module configured to form one or more layers of conductive traces at the surface of the chip and/or within the chip, where the trace formation module may comprise a trace former 626 shown in FIG. 6.

The GRIN former 622 may form the refractive index gradient throughout the thickness of the chip by creating, atomic scale inclusions within the thickness of the chip. The chip may be composed of silicon, and the chip may have a thickness of approximately 1 mm or less, for example. The inclusions may be created, for example, by inducing nanoporosity into the chip, dissociating and diffusing oxygen into the chip, or performing chemical vapor deposition on the chip. The inclusions may have a refractive index lower than the chip and a density of the inclusions may increase from a top surface of the chip to a bottom surface of a chip, for example. As a result, the refractive index gradient may decrease from the top surface of the chip to the bottom surface of the chip, for example.

The optical transceiver provider 624 may etch, grow, form, mount, deposit, and/or otherwise provide one or more IC components at the top surface of the chip to form the IC components on the chip, The optical transceiver provider 624 may further etch, mount, form, deposit, grow and/or otherwise provide one or more laser detectors and laser emitters on the surface of the chip. The IC components and optical transceiver devices may be formed and/or provided at specific locations along the surface of the chip based on an approximate angle of incidence for an optical communication path between communicatively coupled components and devices. A trace former 626 may form a layer of conductive traces at the top surface of the chip and/or one or more layers of conductive traces within the thickness of the chip. The location of the layer(s) of conductive traces may be based on a density of the IC components at the top surface of the chip. Furthermore, the layer(s) of conductive traces may be placed in a location such that the conductive traces avoid paths of optical communication signals transmitted through the chip by the optical transceivers. The conductive traces may be used to electrically couple an IC component to a respective optical transceiver device and/or to otherwise electrically couple various IC components to each other.

The examples in FIGS. 1 through 6 have been described using specific configurations and processes in which fabrication and operation of a chip with a refractive index gradient to facilitate on-chip optical communication may be implemented. Embodiments for fabrication and operation of the chip are not limited to the configurations and processes according to these examples.

Figure 7:
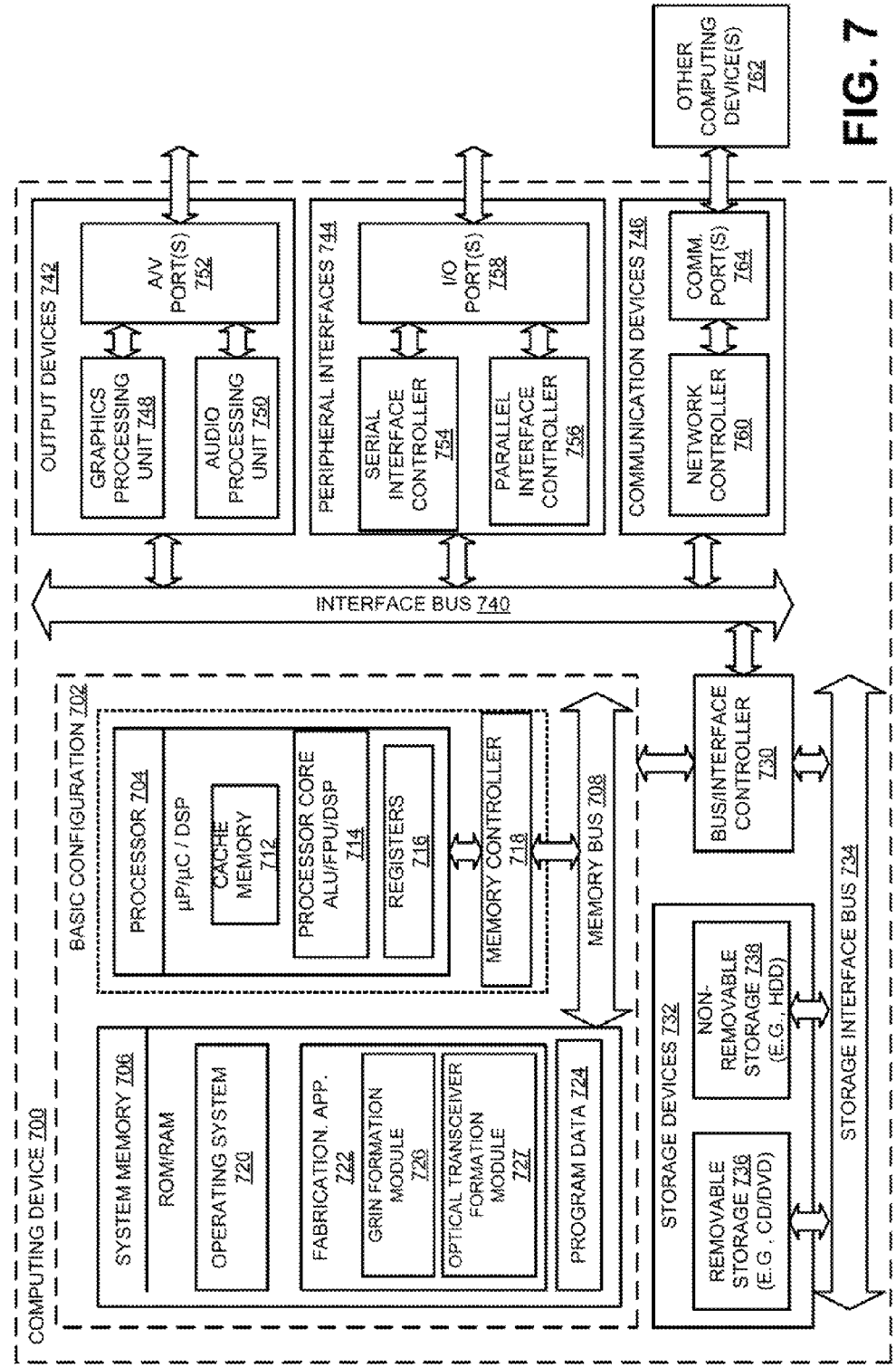
FIG. 7 illustrates a general purpose computing device, which may be used in connection with fabrication of a chip with a gradient refractive index to facilitate on-chip optical communication.

FIG. 7 illustrates a general purpose computing device, which may be used in connection with fabrication of a chip with gradient refractive index, arranged in accordance with at least some embodiments described herein.

For example, the computing device 700 may be used to manage or otherwise control a fabrication process of a chip with refractive index gradient as described herein. in an example basic configuration 702, the computing device 700 may include one or more processors 704 and a system memory 706 A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μp), a microcontroller (μC), a digital signal processor (DSP), or any combination thereof. The processor 704 may include one or more levels of caching, such as a cache memory 712, a processor core 714 and registers 716. The example processor core 714 may include an arithmetic logic unit (AIX), a floating point unit (FRU), a digital signal processing core (DSP core), or any combination thereof An example memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a fabrication application 722, and program data 724.

The fabrication application 722 may include a GRIN formation module 726 and an optical transceiver formation module 727 to fabricate the chip configured to facilitate optical communication, as described herein. In some embodiments, the GRIN former 622 may be used to implement the GRIN formation module 726, and the optical transceiver provider 624 may he used to implement the optical transceiver formation module 727.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may he one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk. (MD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736, and the non-removable storage devices 738 are examples of computer storage media. Computer storage media includes, but is not limited to. RAM, ROM, EEPROM, flash memory or other memory technology. CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices ON example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may he configured to communicate with external devices such as input devices (for example, keyboard, mouse, pen, voice input device, touch input device, etc.) or other peripheral devices (for example, printer, scanner, etc.) via one or more 110 ports 758. An example communication device 746 includes a network controller 760, which may be arranged to facilitate communications with one or more other computing devices 762 over a network communication link via one or more communication ports 764. The one or more other computing devices 762 may include servers at a datacenter, customer equipment, and comparable devices.

The network communication link may be one example of a communication media. Communication media may typically he embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to operate a chip with as refractive index to Facilitate optical communication. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 8:
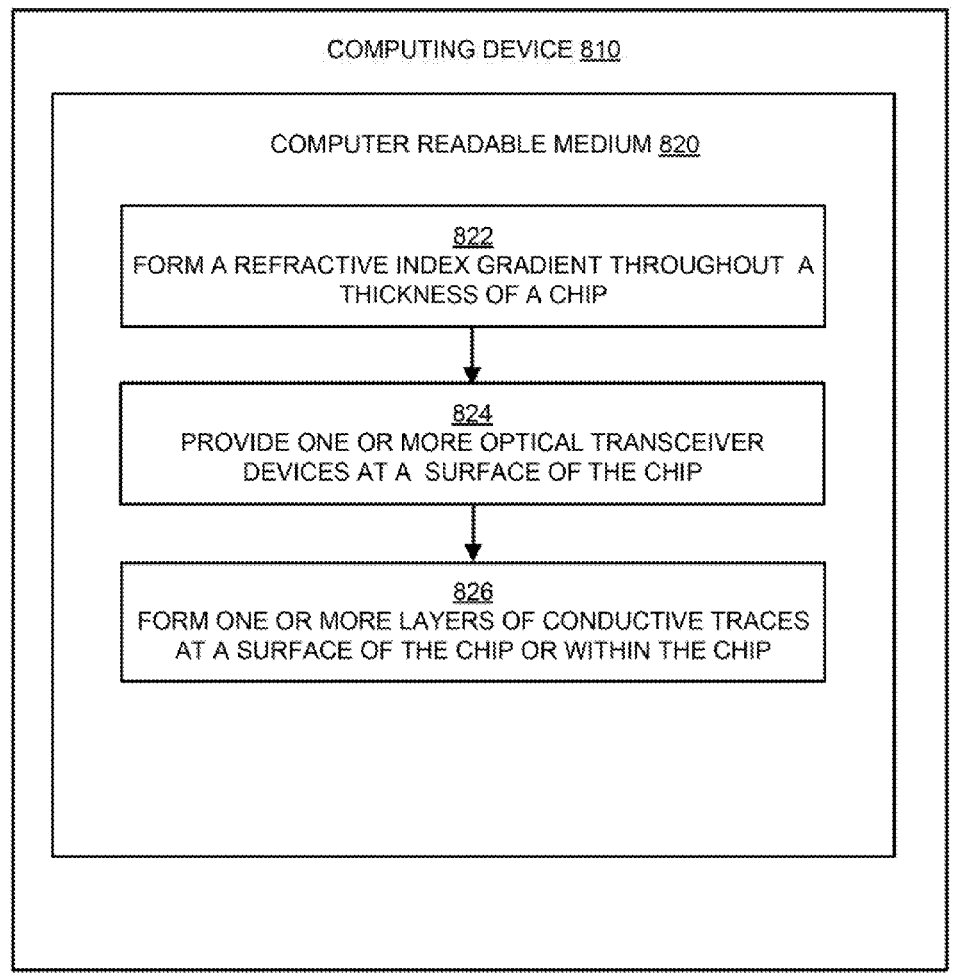
FIG. 8 is a flow diagram illustrating an example method to fabricate a chip with a refractive index gradient to facilitate on-chip optical communication that may be performed or otherwise controlled by a computing device such as the computing device in FIG. 8.

FIG. 8 is a flow diagram illustrating an example method to fabricate a chip with refractive index gradient configured to facilitate on-chip optical communication that may be performed or otherwise controlled by a computing device such as the computing device in FIG. 7, arranged in accordance with at least some embodiments described herein.

Example methods may inc hide one or more operations, functions or actions as illustrated by one or more of blocks 822, 824, and/or 826, and may in some embodiments be performed by a computing device such as the computing device 700 in FIG. 7. The operations described in the blocks 822-826 of one embodiment may also be stored as computer-executable instructions in a non-transitory computer-readable medium, such as a computer-readable medium 820 of a computing device 810, and may be executable by one or more processors.

An example process to fabricate a chip may begin with block 822, "FORM A REFRACTIVE INDEX GRADIENT THROUGHOUT A THICKNESS OF A CHIP," where a GRIN former (e.g., the GRIN former 622) may form a refractive index gradient throughout a thickness of the chip (e.g., the chip 102) by creating atomic scale inclusions within the thickness of the chip. The inclusions may be created, for example, by inducing nanoporosity into the chip via sputter deposition or anodization, dissociating and diffusing oxygen into the chip, or performing chemical vapor deposition on the chip. The inclusions may have a refractive index lower than the chip, and a density of the inclusions may increase from a surface of the chip to an opposite surface of a chip, for example. As a result, the refractive index gradient may decrease from a top surface of the chip to a bottom surface of the chip, for example.

Block 822 may be followed by block 824, "PROVIDE ONE OR MORE OPTICAL TRANSCEIVER DEVICES AT A SURFACE OF THE CHIP," where an optical transceiver provider (e.g., the optical transceiver provider 624) may etch or otherwise provide one or more IC components (e.g., the IC component 108) at the top surface of the chip to form the IC components. The optical transceiver provider may further etch, mount, deposit, form, grow and/or otherwise provide one or more laser emitters (e.g., the laser emitter 104) and laser detectors (e.g., the laser detector 106) at the surface of the chip. The IC components and optical transceiver devices may he etched, mounted, grown or otherwise provided at specific locations along the surface of the chip based on an approximate angle of incidence for an optical communication path between communicatively coupled components and devices. The laser emitters and/or detectors may be configured to transmit an optical communication signal to, or receive the optical communication signal from, at least one other IC component, detector and/or emitter via the optical communication path within the thickness of the chip. The optical communication path may include a direction and distance within the thickness of the chip that is based on the refractive index gradient formed and angle of incidence.

Block 824 may be followed by block 826, "FORM ONE OR MORE LAYERS OF CONDUCTIVE TRACES AT A SURFACE OF THE CHIP OR WITHIN THE CHIP," where a trace former e.g., the trace former 626) may form a layer of conductive traces at the surface of the chip and/or one or more layers of conductive traces within the thickness of the chip. The location of the layer(s) of conductive traces may be based on a density of the IC components at the surface of the chip. Furthermore, the layer(s) of conductive traces may be placed in a location such that the conductive traces avoid paths of optical communication signals transmitted through the chip by the optical transceivers.

The blocks included in the above described process are for illustration purposes. Fabrication of a chip with a refractive index gradient to facilitate on-chip optical communication may be implemented by similar processes with fewer or additional blocks. In some embodiments, the blocks may be performed in a different order. In some other embodiments, various blocks may be eliminated. in still other embodiments, various blocks may be divided into additional blocks, supplemented with other blocks, or combined together into fewer blocks.

Figure 9:
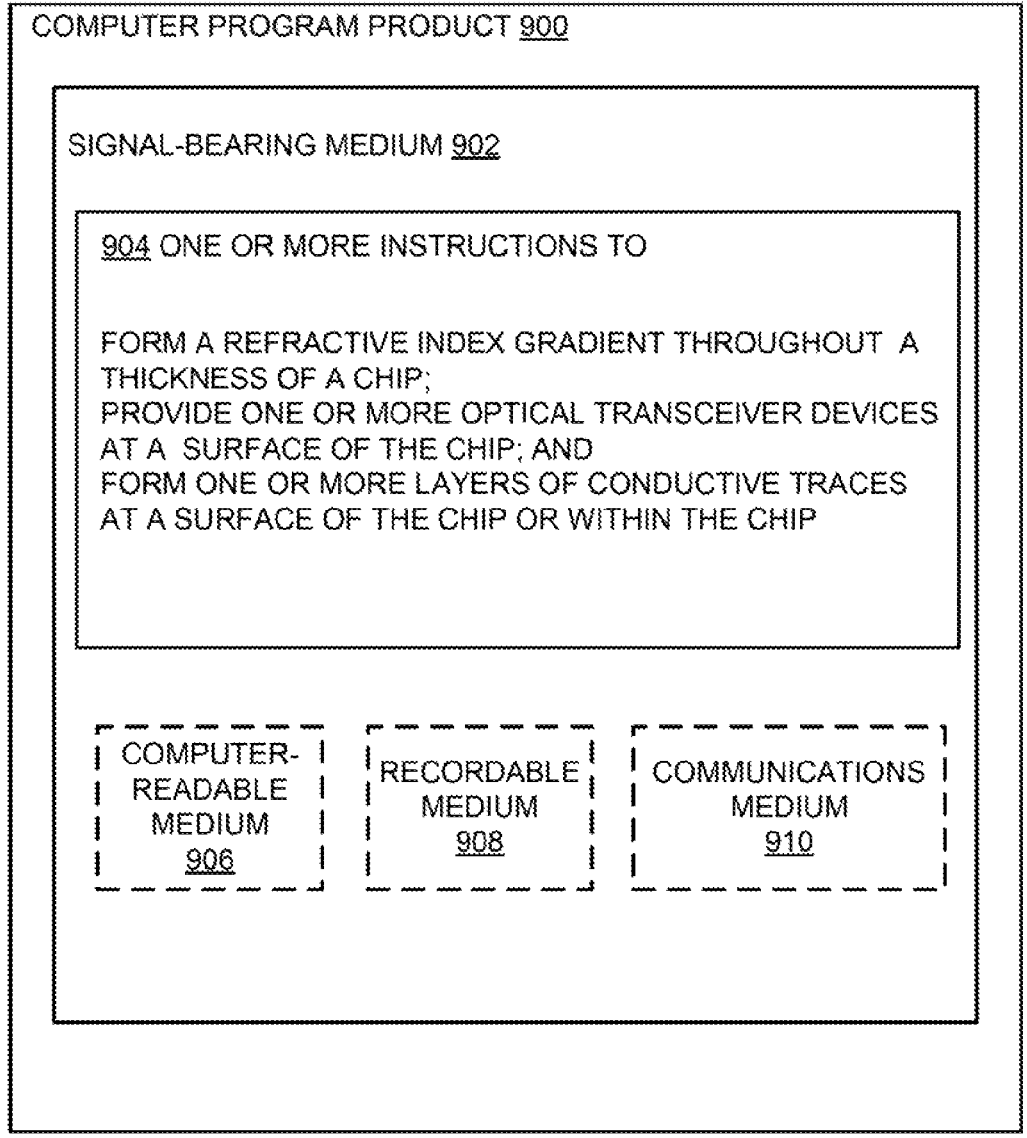
FIG. 9 illustrates a block diagram of an example computer program product, all arranged in accordance with at least some embodiments described herein.

FIG. 9 illustrates a block diagram of an example computer program product, arranged in accordance with at least some embodiments described herein.

In some examples, as shown in FIG. 9, the computer program product 900 may include a signal bearing medium 902 that may also include one or more machine readable instructions 904 that, in response to execution by, for example, a processor may provide the features and operations described herein. Thus, for example, referring to the processor 704 in FIG. 7, the fabrication application 722, the GRIN formation module 726, or the optical transceiver formation module 727 may undertake one or more of the tasks shown in FIG. 9, in response to the instructions 904 conveyed to the processor 704 from the signal bearing medium 902 to perform actions associated with fabrication of a chip with a refractive index gradient to facilitate optical communication, as described herein. Some of those instructions may be, for example, to form a refractive index gradient throughout a thickness of a chip, provide one or more optical transceiver devices at a surface of the chip, and form one or more layers of conductive traces at a surface of the chip or within the chip, according to some embodiments described herein.

In some implementations, the signal bearing medium 902 depicted in FIG. 9 may encompass a computer-readable medium 906, such as but not limited to, a hard disk drive (HDD), a solid state drive (SSD), a Compact Disc (CD), a Digital Versatile Disk (DVD), a digital tape, memory, etc. In some implementations, the signal bearing medium 902 may encompass a recordable medium 908, such as, but not limited to, memory, read/write (R/W) CDs, R/W DVDs, etc. In some implementations, the signal bearing medium 902 may encompass a communication medium 910, such as, but not limited to, a digital and/or an analog communication medium (for example, a fiber optic cable, a waveguide, a wired communication link, a wireless communication link, etc.). Thus, for example, the computer program product 900 may be conveyed to one or more modules of the processor 704 by an RF signal bearing medium, where the signal bearing medium 902 is conveyed by the wireless communications medium 910 (for example, a wireless communications medium conforming with the IEEE 802.11 standard).

According to some examples, apparatuses that include optical communication capability are described. An example apparatus may include a chip, a refractive index gradient formed across a thickness of the chip, one or more integrated circuit (IC) components at a surface of the chip, and one or more optical transceiver devices at the surface of the chip. The optical transceiver devices may be configured to transmit an optical communication signal to or receive the optical communication signal from, at least one of the IC components via an optical communication path within the thickness of the chip, where the optical communication path may include a direction and distance, within the thickness of the chip, that is based on the refractive index gradient and angle of incidence.

In other examples, the chip may comprise silicon and the optical transceiver devices may include a laser emitter and/or a laser detector, The refractive index may decrease from the surface of the chip comprising the IC components and optical transceiver devices to an opposite surface of the chip. The refractive index gradient may be formed from atomic scale inclusions throughout a thickness of the chip, where the inclusions may include a lower refractive index than the chip. A density of the inclusions may increase from the surface of the chip comprising the IC components and optical transceiver devices to an opposite surface of the chip. The thickness of the chip may be less than or equal to 1 mm.

In further examples, a layer of conductive traces may be located at the surface of the chip and/or within the thickness of the chip, where a location of the layer of conductive traces is based on a density of the IC components at the surface of the chip. The optical transceiver devices may be configured to statically project or dynamically project optical communication signals in one or more directions into the chip, where a direction and an incident angle of a projected optical communication signal may be based on a particular planar direction and a distance to be traveled by the projected optical communication signal. At least one of the optical communication signals may include a collimated beam, where the collimated beam may include a laser beam, a visible light beam, or an infrared beam.

According to sonic embodiments, methods to fabricate a chip to facilitate optical communication are provided. An example method may include forming a refractive index gradient across a thickness of the chip, forming one or more integrated circuit (IC) components at a surface of the chip, and providing one or more optical transceiver devices at the surface of the chip. The optical transceiver devices may be configured to transmit an optical communication signal to, or receive the optical communication signal from, at least one of the IC components or other optical transceiver device via an optical communication path within the thickness of the chip, where the optical communication path may include a direction and distance, within the thickness of the chip, that is based on the refractive index gradient formed and angle of incidence.

In other embodiments, the chip may be formed of silicon. Atomic scale inclusions may be created throughout the thickness of the chip to form the refractive index gradient, where the inclusions may include a. lower refractive index than the chip. Inclusions of silica may be formed to create the atomic scale inclusions, where the inclusions may be formed such that a density of the inclusions increases from the surface of the chip comprising the IC components and optical transceiver devices to an opposite surface of the chip. Creation of the inclusions may include inducing nanoporosity into the chip, dissociating and diffusing oxygen into the chip, or performing chemical vapor deposition.

In further embodiments, inducing the nanoporosity into the chip may include inducing the nanoporosity into the chip via sputter deposition or anodization to create the inclusions, Dissociating and diffusing oxygen into the chip may include forming a layer of silica on the surface of the chip, raising the layer of silica to a high temperature, and keeping the layer of silica at the high temperature for a particular time period to dissociate and diffuse oxygen into the chip to create the inclusions. Performing the chemical vapor deposition may include performing the chemical vapor deposition by silane deposition of silicon and introduction of increasing concentrations of oxygen to create the inclusions. The optical transceiver devices may be provided at the surface of the chip by mounting, growing, arid/or etching the optical transceiver devices on the surface of the chip. The optical transceiver devices may include a laser emitter and/or a laser detector.

According to some examples, systems to fabricate a chip to facilitate optical communication are described. An example system may include a gradient index (GRIN) formation module configured to form a refractive index gradient throughout a thickness of the chip, where the refractive index gradient may decrease from a top surface of the chip to a bottom surface of the chip. The example system may also include an optical transceiver formation module configured to mount, grow, and/or etch one or more integrated circuit (IC) components and one or more optical transceiver devices at the top surface of the chip. The optical transceiver devices may be configured to transmit an optical communication signal to, or receive the optical communication signal from, at least one of the IC components or other optical transceiver device via an optical communication path within the thickness of the chip, where the optical communication path may include a direction and distance, within the thickness of the chip, that is based on the refractive index gradient and angle of incidence. The example system may further include a controller coupled to and configured to coordinate operations of the GRIN formation module and optical transceiver formation module.

In other examples, a trace formation module may be coupled to the controller, where the trace formation module may he configured to form a layer of conductive traces on the top surface of the chip. The trace formation module may be further configured to form one or more layers of conductive traces within the thickness of the chip and lay out the conductive traces in the layers such that the conductive traces avoid paths of optical communication signals transmitted through the chip.

According to some embodiments, methods to operate a chip to facilitate optical communication are provided. An example method may include outputting an optical communication signal from a first optical transceiver device located at a surface of the chip, where the chip may include a refractive index gradient across a thickness of the chip. The example method may also include propagating the optical communication signal from the first optical transceiver device to a second optical transceiver device, located at a same surface of the chip, via an optical communication path within the thickness of the chip, where the optical communication path may include a direction and distance, within the thickness of the chip, that is based on the refractive index gradient and angle of incidence.

In other embodiments, propagating the optical communication signal from the first optical transceiver device to the second optical transceiver device may include statically projecting or dynamically projecting the optical communication signal, where a direction and an incident angle of the propagated optical communication signal may be based on a particular planar direction and a distance to be traveled by the propagated optical communication signal via the optical communication path. The chip may be a first chip, the optical communication signal may be a first optical communication signal, and a second optical communication signal may be transmitted from the first optical transceiver device to a third optical transceiver device located on a second chip, where the second chip may be positioned beneath the first chip in a stacked formation.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting, In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve, a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being, so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should he interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not. be construed to imply that the introduction of a claim recitation by the indefinite articles "a" or "an" limits any particular claim containing such introduced, claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"), the same holds true for the use of definite articles used to introduce claim recitations, in addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A. B, and C, etc." is used, in general, such a construction is intended in the sense one having skill in the art would understand the convention (for example, "a system having at least one of A, B, and C" would include but not be limited to systems that. have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being, broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. An apparatus that includes optical communication capability, the apparatus comprising:
   a chip;
   a refractive index gradient formed from atomic scale inclusions across a thickness of the chip, wherein a density of the inclusions increases from a surface of the chip that comprises one or more integrated circuit (IC) components and one or more optical transceiver devices to an opposite surface of the chip;
   the one or more IC components at the surface of the chip; and
   the one or more optical transceiver devices at the surface of the chip and configured to transmit an optical communication signal to, or receive the optical communication signal from, at least one of the one or more IC components via an optical communication path, within the thickness of the chip,
   wherein the optical communication path includes a direction and distance, within the thickness of the chip, that is based on the refractive index gradient and an angle of incidence.

2. The apparatus of claim 1, wherein the one or more optical transceiver devices include at least one of a laser emitter or a laser detector.

3. The apparatus of claim 1, wherein the refractive index decreases from the surface of the chip that comprises the one or more IC components and the one or more optical transceiver devices to the opposite surface of the chip.

4. The apparatus of claim 1, wherein the inclusions have a lower refractive index than the chip.

5. The apparatus of claim 1, further comprising:
   a layer of conductive traces located at one of: the surface of the chip and within the thickness of the chip.

6. The apparatus of claim 5, wherein a location of the layer of conductive traces is based on a density of the one or more IC components at the surface of the chip.

7. The apparatus of claim 1, wherein the one or more optical transceiver devices are configured to at least one of statically project and dynamically project optical communication signals in one or more directions into the chip.

8. The apparatus of claim 7, wherein a direction and an incident angle of a projected optical communication signal is based on a particular planar direction and a distance to be traveled by the projected optical communication signal.

9. The apparatus of claim 7, wherein at least one of the optical communication signals includes a collimated beam that comprises one of: a laser beam, a visible light beam, and an infrared beam.

10. A method to fabricate a chip to facilitate optical communication, the method comprising:
    forming a refractive index gradient by creating atomic scale inclusions across a thickness of the chip, wherein creating the atomic scale inclusions comprises forming the inclusions such that a density of the inclusions increases from a surface of the chip that comprises one or more integrated circuit (IC) components and one or more optical transceiver devices to an opposite surface of the chip;
    forming the one or more IC components at the surface of the chip; and
    providing the one or more optical transceiver devices at the surface of the chip, wherein the one or more optical transceiver devices are configured to transmit an optical communication signal to, or receive the optical communication signal from, at least one of the one or more IC components or other optical transceiver device via an optical communication path within the thickness of the chip, and wherein the optical communication path includes a direction and distance, within the thickness of the chip, that is based on the refractive index gradient formed and an angle of incidence.

11. The method of claim 10, further comprising forming the chip of silicon.

12. The method of claim 10, wherein the inclusions have a lower refractive index than the chip.

13. The method of claim 10, wherein creating the atomic scale inclusions comprises forming the inclusions of silica.

14. The method of claim 10, wherein creating the atomic scale inclusions comprises one of:
    inducing nanoporosity into the chip;
    dissociating and diffusing oxygen into the chip; and
    performing chemical vapor deposition.

15. The method of claim 14, wherein inducing the nanoporosity into the chip comprises inducing the nanoporosity into the chip via one of sputter deposition and anodization to create the inclusions.

16. The method of claim 14, wherein dissociating and diffusing oxygen into the chip includes:
    forming a layer of silica on the surface of the chip;
    raising the layer of silica to a high temperature; and
    keeping the layer of silica at the high temperature for a particular time period to dissociate and diffuse oxygen into the chip to create the inclusions.

17. The method of claim 14, wherein performing the chemical vapor deposition comprises performing the chemical vapor deposition by silane deposition of silicon and introduction of increasing concentrations Of oxygen to create the inclusions.

18. The method of claim 10, wherein providing the one or more optical transceiver devices at the surface of the chip includes at least one of: mounting, growing, and etching the one or more optical transceiver devices on the surface of the chip.

19. A method to operate a chip to facilitate optical communication, the method comprising:
    outputting, an optical communication signal from a first optical transceiver device located at a surface of the chip, wherein the chip includes a refractive index gradient formed from atomic scale inclusions across a thickness of the chip, and wherein a density of the inclusions increases from the surface of the chip that comprises the first optical transceiver device to an opposite surface of the chip; and
    propagating the optical communication signal from the first optical transceiver device to a second optical transceiver device, located at a same surface of the chip, via an optical communication path within the thickness of the chip, wherein the optical communication path includes a direction and distance, within the thickness of the chip, that is based on the refractive index gradient and an angle of incidence.

20. The method of claim 19, wherein propagating the optical communication signal from the first optical transceiver device to the second optical transceiver device comprises one of statically projecting and dynamically projecting the optical communication signal.

21. The method of claim 19, wherein a direction and an incident angle of the propagated optical communication signal is based on a particular planar direction and a distance to be traveled by the propagated optical communication signal via the optical communication path.

22. The method of claim 19, wherein the chip comprises a first chip, wherein the optical communication signal comprises a first optical communication signal, and wherein the method further comprises transmitting a second optical communication signal from the first optical transceiver device to a third optical transceiver device located on a second chip, wherein the second chip is positioned beneath the first chip in a stacked formation.

* * * * *

UNITED STATES PATENT AND TRADEMARK OFFICE
CERTIFICATE OF CORRECTION

| | | |
|---|---|---|
| PATENT NO. | : 9,829,663 B2 | Page 1 of 4 |
| APPLICATION NO. | : 15/101009 | |
| DATED | : November 28, 2017 | |
| INVENTOR(S) | : Millar | |

It is certified that error appears in the above-identified patent and that said Letters Patent is hereby corrected as shown below:

On the Title Page

Item (71), under "Applicant", in Column 1, Lines 1-3, delete "EMPIRE TECHNOLOGY DEVELOPMENT LLC, Wilmington (DE)" and insert -- EMPIRE TECHNOLOGY DEVELOPMENT LLC, Wilmington, DE (US) --, therefor.

In the Specification

In Column 1, Line 8, delete "wider" and insert -- under --, therefor.

In Column 1, Line 31, delete "ma" and insert -- may --, therefor.

In Column 1, Line 65, delete "he" and insert -- be --, therefor.

In Column 2, Line 10, delete "firm" and insert -- form --, therefor.

In Column 2, Line 45, delete "limiting, in" and insert -- limiting. In --, therefor.

In Column 2, Line 54, delete "full" and insert -- fully --, therefor.

In Column 3, Line 31, delete "pan" and insert -- part --, therefor.

In Column 3, Line 42, delete "Which" and insert -- which --, therefor.

In Column 3, Line 47, delete "thereof" and insert -- thereof. --, therefor.

In Column 3, Line 50, delete "described," and insert -- described. --, therefor.

In Column 3, Line 51, delete "creating. atomic" and insert -- creating atomic --, therefor.

Signed and Sealed this
Twenty-fourth Day of April, 2018

Andrei Iancu
*Director of the United States Patent and Trademark Office*

CERTIFICATE OF CORRECTION (continued)
U.S. Pat. No. 9,829,663 B2

In Column 3, Line 60, delete "author" and insert -- and/or --, therefor.

In Column 4, Line 3, delete "102. may" and insert -- 102 may --, therefor.

In Column 4, Line 5, delete "components 108)" and insert -- components (e.g., 108) --, therefor.

In Column 4, Line 35, delete "different. surface" and insert -- different surface --, therefor.

In Column 4, Line 38, delete "102," and insert -- 102. --, therefor.

In Column 5, Line 8, delete "decrease," and insert -- decrease. --, therefor.

In Column 5, Line 20, delete "forming, a" and insert -- forming a --, therefor.

In Column 5, Line 30, delete "devices," and insert -- devices. --, therefor.

In Column 5, Line 56, delete "IC. components" and insert -- IC components --, therefor.

In Column 6, Line 10, delete "202," and insert -- 202. --, therefor.

In Column 6, Line 45, delete "index," and insert -- index. --, therefor.

In Column 7, Line 37, delete "318)." and insert -- 318), --, therefor.

In Column 7, Line 39, delete "detectors 304," and insert -- detectors (e.g., 304, --, therefor.

In Column 8, Line 27, delete "placed. in" and insert -- placed in --, therefor.

In Column 9, Line 10, delete "at. the" and insert -- at the --, therefor.

In Column 9, Line 13, delete "varied, and" and insert -- varied and --, therefor.

In Column 9, Line 18, delete "50013" and insert -- 500B --, therefor.

In Column 9, Lines 61-62, delete "creating, atomic" and insert -- creating atomic --, therefor.

In Column 10, Line 10, delete "chip, The" and insert -- chip. The --, therefor.

In Column 10, Line 43, delete "herein. in" and insert -- herein. In --, therefor.

In Column 10, Line 46, delete "706 A" and insert -- 706. A --, therefor.

In Column 10, Line 55, delete "714 and" and insert -- 714, and --, therefor.

In Column 10, Line 57, delete "(AIX)," and insert -- (ALU), --, therefor.

CERTIFICATE OF CORRECTION (continued)
U.S. Pat. No. 9,829,663 B2

In Column 10, Line 57, delete "(FRU)," and insert -- (FPU), --, therefor.

In Column 10, Line 58, delete "thereof An" and insert -- thereof. An --, therefor.

In Column 11, Line 7, delete "he" and insert -- be --, therefor.

In Column 11, Line 16, delete "he" and insert -- be --, therefor.

In Column 11, Line 22, delete "disk. (MD)" and insert -- disk (DVD) --, therefor.

In Column 11, Line 32, delete "to. RAM," and insert -- to, RAM, --, therefor.

In Column 11, Line 33, delete "technology." and insert -- technology, --, therefor.

In Column 11, Line 43, delete "devices ON" and insert -- devices (for --, therefor.

In Column 11, Line 53, delete "he" and insert -- be --, therefor.

In Column 11, Line 57, delete "110" and insert -- I/O --, therefor.

In Column 11, Line 66, delete "he" and insert -- be --, therefor.

In Column 12, Line 19, delete "with as" and insert -- with a --, therefor.

In Column 12, Line 19, delete "Facilitate" and insert -- facilitate --, therefor.

In Column 12, Line 39, delete "inc hide" and insert -- include --, therefor.

In Column 13, Line 9, delete "he" and insert -- be --, therefor.

In Column 13, Line 24, delete "former e.g.," and insert -- former (e.g., --, therefor.

In Column 13, Line 39, delete "eliminated. in" and insert -- eliminated. In --, therefor.

In Column 14, Line 1, delete "as but" and insert -- as, but --, therefor.

In Column 14, Line 26, delete "to or" and insert -- to, or --, therefor.

In Column 14, Line 35, delete "detector," and insert -- detector. --, therefor.

In Column 14, Line 59, delete "sonic" and insert -- some --, therefor.

In Column 15, Line 10, delete "a. lower" and insert -- a lower --, therefor.

In Column 15, Line 22, delete "inclusions," and insert -- inclusions. --, therefor.

In Column 15, Line 33, delete "arid/or" and insert -- and/or --, therefor.

In Column 15, Line 61, delete "he" and insert -- be --, therefor.

In Column 16, Line 50, delete "thereof In" and insert -- thereof. In --, therefor.

In Column 16, Line 63, delete "thereof and" and insert -- thereof, and --, therefor.

In Column 17, Line 15, delete "limiting," and insert -- limiting. --, therefor.

In Column 17, Line 56, delete "achieve, a" and insert -- achieve a --, therefor.

In Column 17, Line 63, delete "being, so" and insert -- being so --, therefor.

In Column 18, Line 14, delete "he" and insert -- be --, therefor.

In Column 18, Line 24, delete "not. be" and insert -- not be --, therefor.

In Column 18, Line 27, delete "introduced, claim" and insert -- introduced claim --, therefor.

In Column 18, Line 32, delete "more")," and insert -- more"); --, therefor.

In Column 18, Line 41, delete "A. B," and insert -- A, B, --, therefor.

In Column 18, Line 45, delete "that. have" and insert -- that have --, therefor.

In Column 18, Line 59, delete "thereof" and insert -- thereof. --, therefor.

In Column 18, Line 61, delete "being, broken" and insert -- being broken --, therefor.

In the Claims

In Column 20, Line 45, in Claim 17, delete "Of oxygen" and insert -- of oxygen --, therefor.

In Column 20, Line 54, in Claim 19, delete "outputting, an" and insert -- outputting an --, therefor.